United States Patent

[11] 3,624,744

| [72] | Inventor | Donald W. Munger<br>New Milford, Conn. |
|---|---|---|
| [21] | Appl. No. | 14,764 |
| [22] | Filed | Feb. 26, 1970 |
| [45] | Patented | Nov. 30, 1971 |
| [73] | Assignee | Automation Industries Inc.<br>El Segundo, Calif.<br>Continuation of application Ser. No.<br>440,205, Feb. 26, 1965, now abandoned.<br>This application Feb. 26, 1970, Ser. No.<br>14,764 |

[54] ULTRASONIC TESTER
16 Claims, 7 Drawing Figs.

[52] U.S. Cl. .................................................. 128/2.05 R,
73/67.9, 128/2 V, 128/24 A
[51] Int. Cl. ................................................ A61b 5/02
[50] Field of Search ........................................... 128/2.1,
2.05, 2.06, 24.05, 2 V, 2.05 R, 2.06 R, 24 A;
73/67.9

[56] References Cited
UNITED STATES PATENTS

| 3,156,110 | 11/1964 | Clynes | 73/67.8 |
|---|---|---|---|
| 3,226,976 | 1/1966 | Wood et al. | 73/67.9 |
| 3,238,767 | 3/1966 | Clynes | 73/67.9 |
| 3,280,622 | 10/1966 | Carlin | 73/67.9 |
| 3,323,512 | 6/1967 | Clynes | 128/2 |
| 3,334,622 | 8/1967 | Brech | 128/2 |

OTHER REFERENCES

Biosonor 200, Sonomedic Corp. Publication, (Received in Gr. 335, May 20, 1964)

Beckwith, T. G. Mechanical Measurements, 1961, Addison-Wesley Publ. Co., (pp. 167–173)

*Primary Examiner*—Richard A. Gaudet
*Assistant Examiner*—Kyle L. Howell
*Attorney*—Victor Sepulveda ABSTRACT: Herein described is improved means for ultrasonically inspecting a workpiece. An ultrasonic tester is disclosed herein which is particularly adapted for ultrasonically inspecting moving workpieces like living organs (for example, the mitral valve in the heart) and producing a visual display showing the movement of the living organ whereby the operator can readily determine whether the movement is normal. In addition, a reference trace is provided in the display for comparison with the movement.

INVENTOR.
Donald W. Munger

INVENTOR:
Donald W. Munger

Attorney

ULTRASONIC TESTER

CROSS-REFERENCE TO RELATED APPLICATIONS

This application is a continuation of copending application Ser. No. 440,205 for Ultrasonic Tester, filed Feb. 26, 1965, now abandoned.

There are a wide variety of ultrasonic testers available at the present time for nondestructively measuring various characteristics of a workpiece such as its dimensions, the presence or absence of internal structures such as hidden defects and the location of such structures. In the so-called pulse-echo type of ultrasonic tester, transducer means are acoustically coupled to the workpiece and pulses or bursts of ultrasonic energy are transmitted into the interior of the workpiece. Echoes of this energy are reflected from various interfaces in the workpiece (for example, defects, the front and back surfaces, etc.) and received by the transducer means. Circuitry responsive to the time delay required to receive the echoes is coupled to the transducer and to suitable display means such as a cathode-ray oscilloscope. The horizontal scanning in the oscilloscope is synchronized with the transmission of the ultrasonic energy or the reception of a particular one of the echoes. A display is produced on the face of the oscilloscope tube wherein the spacing between a pair of markers or "blips" indicates the dimensions of the characteristic.

As a result of the repeated synchronized scanning, a display is produced which is effective to indicate the various characteristics of the workpiece such as its dimensions, and the presence or absence of hidden defects, the location of such defects, etc. The foregoing type of pulse-echo ultrasonic tester is particularly useful with rigid workpieces such as piece of metal wherein the various characteristics such as any defects are of a static nature. When employed with a static workpiece the display is of a static nature and can be readily observed and understood by an operator.

However, under some circumstances it is desirable to study moving or dynamic workpieces such as one or more of the organs in the human body, and particularly the manner in which the organ moves. For example, it may be desirable to study the motion of the mitral valve as it opens and closes. It is possible to transmit pulses of ultrasonic energy into the mitral valve and to receive echoes therefrom. Since such a target has a rhythmatic physical motion, the pulse-echo type of tester described above produces a visual display having a corresponding dynamic rhythmic motion, more particularly the distance between the "blips" varies as the mitral valve moves. As a consequence, heretofore it has been extremely difficult, if not completely impossible, for an operator to observe the moving display and obtain any meaningful information therefrom. It will thus be seen that although prior ultrasonic testers have been very useful in measuring the various characteristics of static workpieces, they have serious limitations when used in observing the movement of dynamic workpieces.

The present invention provides an ultrasonic tester which overcomes the foregoing difficulties and limitations. More particularly, the present invention provides an ultrasonic tester which is particularly adapted to be used for studying the motion of an organ such as the mitral valve of the heart. In addition, the ultrasonic tester is particularly adapted to display the resultant information in a form which is very simple and easy to observe and understand, and which, if so desired, may be permanently recorded.

The single embodiment of the ultrasonic tester disclosed herein is particularly adapted to be employed for use in studying the motion of moving organs such as the opening and closing of the mitral valve. The tester includes an ultrasonic transducer or probe which may be acoustically coupled to a patient's chest for transmitting pulses of ultrasonic energy into the mitral valve and receiving echoes reflected from the valve as it opens and closes. Appropriate circuitry is coupled to the transducer so as to be responsive to the echo signals and produce video signals that are proportional to the time delay required to receive the echoes. A cathode-ray oscilloscope is coupled to the circuitry so that the electron beam therein is amplitude modulated in accordance with the reception of the echoes. The beam is scanned across the face of the oscilloscope in a first direction in synchronism with the transmission of the ultrasonic energy each time a pulse of energy is transmitted. At the same time the beam is also scanned at right angles to the direction of the first scan. The second scan is relatively slow and requires a period of time that may be several times longer than required for the organ being observed, i.e., the mitral valve, to complete one or more cycles. This produces an enlarged raster on the face of the oscilloscope whereby the time-motion characteristics of a mitral valve may be observed as it opens and closes during several cycles of its dynamic pumping action. As a consequence of this time-motion display, the operator can visually or manually observe the raster and thereby quickly comprehend the manner in which the mitral valve is functioning. If desired, a photograph may be made from the display so as to provide a permanent record that may be easily studied at any subsequent time.

These and other features and advantages of the present invention will become readily apparent from the following detailed description of one operative embodiment thereof, particularly when taken in connection with the accompanying drawings wherein like reference numerals refer to like parts and wherein:

Referring to the drawings in more detail, the present invention is particularly adapted to be embodied in an ultrasonic tester 10 for inspecting the internal structure of a workpiece. Although this tester 10 may be used for inspecting a wide variety of different types of workpieces, in the present instance it is particularly adapted to be employed for inspecting dynamic workpieces wherein one or more portions thereof are moving. By way of example, the present tester 10 is illustrated and described with particular reference to observing the opening and closing of the mitral valve in a human heart. However, it is to be understood that it may be employed for observing the motion and operation of a wide variety of other organs or any type of workpiece wherein a time-motion (TM) mode of display is desirable.

Figure 1:
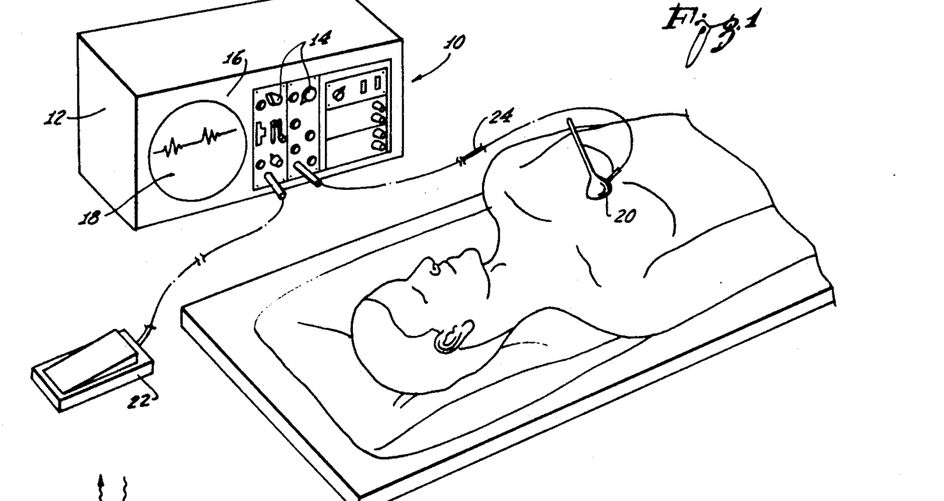
FIG. 1 is a perspective view of an ultrasonic tester embodying one form of the present invention being used as an ultrasonic cardiograph.

As may best be seen in FIG. 1, the ultrasonic tester 10 is embodied in an outer protective housing 12. The various electronic circuits which are included in the tester 10 are enclosed in the housing 12 and controlled by a plurality of controls and switches 14 on the front panel 16.

Suitable readout or display means may be provided for indicating the characteristics of the workpiece. In the present instance, this includes an oscilloscope or cathode-ray tube 18 having its face positioned so as to be visible through an opening in the front panel 16. If it is desired to provide a permanent record a camera mounting may be attached to the front panel 16 for taking photographs of the displays or oscillograms produced upon the face of the cathode ray tube 18. A foot-actuated switch 22 is coupled to the tester 10 so as to permit the operator to trigger the camera and take a picture of the oscillogram on the face of the tube 18 even though his hands are occupied.

An ultrasonic probe 20 may be plugged into a socket on the front panel 16 by means of a flexible coaxial cable 24. The probe 20 which may be of a conventional variety includes an ultrasonic transducer device such as a piezoelectric crystal. When an electrical signal is supplied to the crystal the probe 20 radiates ultrasonic energy. Conversely, when ultrasonic energy is received by the probe 20 and is incident upon the crystal, a corresponding electrical current will be produced. The resultant electrical signal will have the same frequency as the incident ultrasonic energy, and will occur at substantially the same instant of time and have substantially the same time duration, etc.

The probe 20 may be mounted in a suitable structure for positioning it in an acoustical relationship with the workpiece. However, in the present instance the probe 20 is adapted to be hand held whereby it may be manually placed against the workpiece so as to be acoustically coupled thereto. Since the present ultrasonic tester 10 may be employed to study and/or measure the motion of a moving target, the probe 20 may be positioned so as to direct ultrasonic energy into any organ of the human body.

In the present instance the probe 20 is shown as being positioned on a patient's chest for directing ultrasonic energy into the mitral valve and receiving echoes therefrom. The operation of the tester 10 will be described in connection with signals obtained as a result of monitoring the mitral valve. However, it should be understood that the tester 10 is capable of monitoring a wide variety of other organs.

Figure 2:
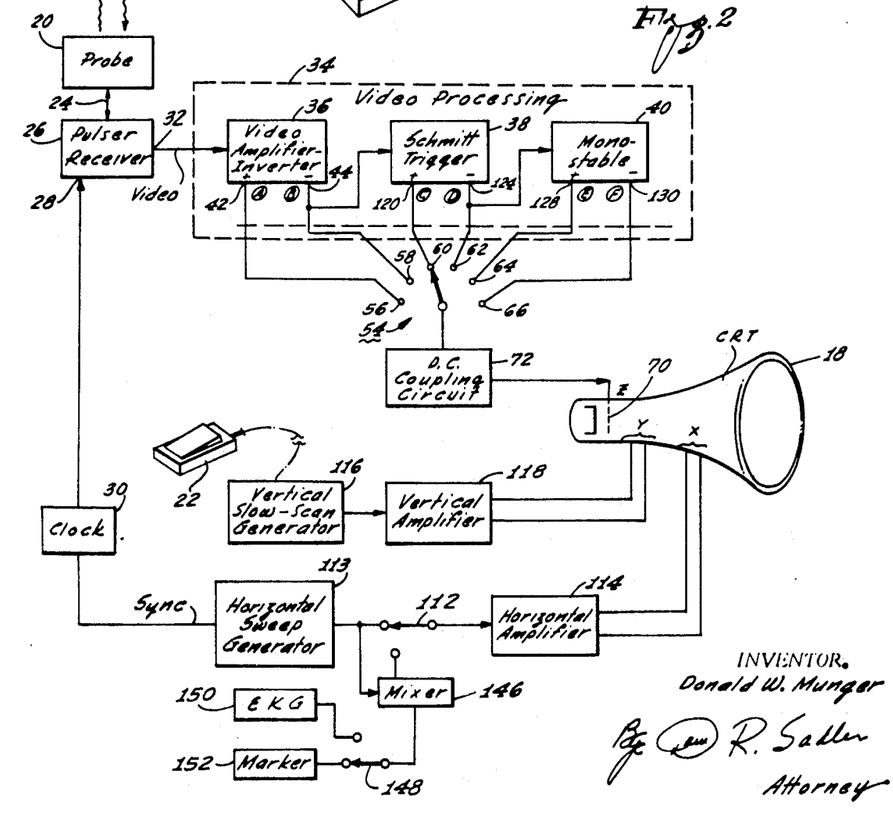
FIG. 2 is a block diagram of the ultrasonic tester of FIG. 1.

The circuitry of the tester 10 for exciting the probe 20 into radiating ultrasonic energy and for being energized by the received echoes of such energy is disclosed in block form in FIG. 2. The coaxial cable 24 from the pickup probe 20 is operatively coupled to a pulser-receiver 26. The pulser-receiver 26 is adapted to supply a pulse of electrical current of ultrasonic frequency to the crystal or transducer in the probe 20. This will excite the probe 20 and cause it to radiate a short pulse or burst of ultrasonic energy. The probe 20 is positioned so that the radiated energy will travel into the mitral valve and heart so as to be reflected therefrom.

A control input 28 to the pulser-receiver 26 is coupled to the output of a clock 30. The clock 30 is effective to produce a series of clock pulses having a frequency corresponding to repetition rate of the tester 10 which, by way of example, may be on the order of 1 kilocycle. Each time a clock pulse is supplied to the pulser-receiver 26, the probe 20 is energized and transmits a short burst of ultrasonic energy. Following this, the probe 20 becomes passive and "listens" for any echoes that result from the transmission.

If an echo is received, the electrical or R.F. signal from the probe 20 will pass through the pulser-receiver 26 to the signal output 32. The signal output 32 of the pulser-receiver 26 is coupled to a video-processing circuit 34. This circuit 34 is effective to utilize the video signals from the pulser-receiver 26 for actuating the various portions of the tester 10.

The input to the processing circuit 34 includes a combination video amplifier-signal inverter 26 which, in turn, is coupled to a Schmitt trigger 38 and a monostable multivibrator 40. The amplifier 36 is effective to amplify the magnitude of the video signals to a more useful level. The amplifier 36 is preferably a conventional broad device that will not produce a material amount of distortion of the video signal.

The amplifier 36 may have a single signal output upon which the amplified video signal will be present. However, for reasons that will become apparent subsequently, in the present instance it includes a pair of signal outputs 42 and 44 and means for inverting the video signal. As a result, a positive or uninverted video signal will be present on the first or "A" output 42 and a negative or inverted video signal will be present on the second or "B" output 44. These two signals are substantially identical to each other except that their polarities are reversed. A small portion of a typical signal which may be present on the first, positive or "A" output 42 is shown in line A of FIG. 2 while a corresponding portion of a signal on the second, negative or "B" output 44 is shown in line B.

The character of this signal may vary considerably depending upon the nature of the organ reflecting the energy and the particular position of the organ. By way of example, the signals may include a first pulse 46 that corresponds to an echo from the mitral valve and a second pulse 48 that corresponds to an echo from the back side of the heart, i.e., the wall aligned with the mitral valve. It should be understood that, at this point in the circuit, these pulses 46 and 48 may be a single wave as shown or a packet of higher frequency waves having an envelope corresponding to the shape of the pulses 46 and 48. The amplitudes of these two pulses 46 and 48 will vary over a considerable range; however, they will normally always exceed a predetermined threshold level 50.

Between the pulses 46 and 48 of interest, there may be a considerable number of spurious pulses 52 resulting from various echoes, etc. The amplitudes of these pulses 52 are normally considerably less than the threshold level 50.

A multiposition selector switch 54 may be electrically provided in the output of the video-processing circuit 34. This switch 54 is physically mounted on the front panel 16 and includes an exposed selector knob whereby it may be manually controlled. The switch 54 includes a plurality of fixed contacts 56, 58, 60, 62, 64 and 66 that are electrically connected to the outputs from the video amplifier-inverter 36, from the Schmitt trigger 38 and from the monostable multivibrator 40. The switch also includes a movable contact 68 which is adapted to selectively engage the various fixed contacts 56 to 66 and establish an electrical circuit therebetween.

The movable contact 68 is electrically connected to the control grid 70 of the cathode-ray oscilloscope tube 18. The signal supplied to the control grid 70 will thereby amplitude or intensity modulate the electron beam reaching the face of the tube 18. This, in turn, will modulate the intensity or brilliance of the luminous oscillogram produced. For reasons that will become apparent subsequently, it is desirable to employ direct coupling between the switch 54 and control grid 70. In addition to coupling an undistorted signal from the switch 54 to the control grid 70, it is also necessary to add a large negative direct voltage thereto. In the type of tube 18 normally employed, this direct voltage is on the order of several thousand volts.

There are a wide variety of circuits that are capable of direct coupling the switch 54 to the control grid 70. However, it has been found that the circuit 72 in FIG. 4 has certain advantages. This circuit 72 includes an input tube 74 which is coupled as a cathode follower. More particularly, the cathode 76 is connected to ground by means of a load resistor 78 while the plate 80 is connected directly to a substantially constant DC voltage such as a B-plus power supply 82. The control grid 84 of the input tube 74 is direct coupled to the movable contact 68 in the selector switch 54.

Figure 4:
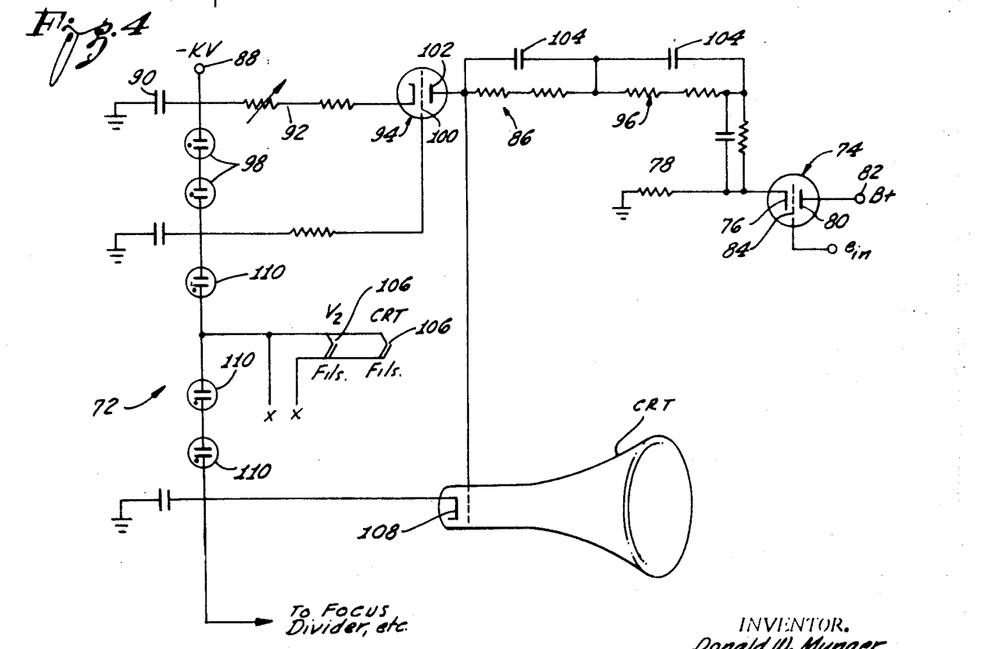
FIG. 4 is a wiring diagram of a direct coupled circuit for energizing the cathode-ray tube in the block diagram of FIG. 2, and FIGS. 5, 6 and 7 are typical oscillogram displays produced by the ultrasonic tester.

The cathode 76 is in turn coupled to the control grid 70 in the cathode ray tube 18 by means of an adding circuit 86. The adding circuit 86 is effective to add a large negative voltage from a negative source 88 to the video signal without materially altering the shape of the video signal. The voltage-adding circuit 86 includes a network which extends between ground and the cathode 76 of the input tube 74.

The network includes a condenser 90, a resistor 92, a triode 94 and a resistive plate load 96, all connected in series. It should be noted that each of the resistive loads may be a single resistor. However, due to the large voltages which are encountered, it has been found desirable to divide each load into a plurality of resistors, as shown. This will reduce the magnitude of the voltages across each resistor and thereby reduce the strain to which it is subjected. The high-voltage negative source 88 is connected directly to the junction between the condenser 90 and resistor 92. The magnitude of the voltage from the negative source 88 will be in the range which is suitable for biasing the control grid 70 of the cathode-ray tube 18.

A constant voltage device such as one or more neon tubes 98 are coupled to the control grid 100 in parallel to the cathode resistor 92. These tubes 98 will be effective to maintain a constant voltage differential between the cathode and the control grid 100. This, in turn, will cause constant current to flow through the tube 94. As a consequence, the tube 94 will function as a constant current device and produce a constant direct current through the resistive plate load 96. This, in turn, will be effective to produce a constant voltage differential between the plate 102 and the cathode 76. Thus, as the voltage on the cathode 76 varies the voltage on the plate 102 will vary in an identical manner but at a much greater negative voltage.

The control grid 70 of the cathode-ray tube 18 is coupled directly to the plate 102 of the triode 94 whereby the video signal with a large negative DC component will be directly coupled onto the grid 70. In order to preserve the high-frequency portions of the video signal it has been found desirable to provide a plurality of condensers 104 in parallel to the plate load resistors 96. By employing a series of condensers the voltage across each of the condensers will be reduced.

The filaments 106 of the triode 94 and the cathode-ray tube 18, as well as the cathode 108 of the cathode-ray tube 18, may be coupled directly to the negative source 88 by means of constant voltage devices such as neon tubes 110. It will thus be seen that the cathode 108 and control grid 70 of the cathode-ray tube 18 are maintained at a high negative voltage suitable for operating the tube 18 while the input signal is directly coupled to the control grid 70.

The horizontal or X deflection means for the cathode-ray tube are coupled to a horizontal sweep generator 113 by means of a switch 112 and a horizontal amplifier 114. The generator 113 is coupled to the clock 30 and is effective to produce a linear sweep signal each time that the pulser-receiver 26 is energized by a clock pulse. When the switch 112 is in the position shown the sweep signal will be coupled directly into the amplifier 114. The amplifier 114 will amplify the sweep signal whereby the electron beam will sweep horizontally across the face of the cathode-ray tube 18 at a substantially uniform rate.

The horizontal sweep is synchronized with the actuation of the probe 20 whereby the horizontal scan will commence at approximately the same time as the ultrasonic energy is radiated from the probe 20. The scan rate is relatively high so that a horizontal scan will be completed in slightly more time than is required for a pulse to be transmitted into the heart and the echo received.

Thus, each time a pulse of ultrasonic energy is transmitted, the face of the tube 18 will be scanned once in a horizontal direction to produce a display line. During this scan the video signal supplied to the control grid 70 will intensity modulate the electron beam. As a consequence, the intensity or brilliance of the various portions of the display line will correspond to the amount of energy received by the probe 20 during the scan. If the movable contact 68 engages the contact 56 the positive-going pulses 46 and 48 in wave A will produce brighter spots in a dim or dark line. However, if the contact 58 is engaged the negative-going pulses will produce darker spots in a bright line.

In addition, a vertical scan may be provided for slowly raising the successive display lines to form a raster on the face of the tube 18. A vertical sweep generator 116 and a vertical amplifier 118 are direct coupled to the vertical or Y deflection means in the tube 18. This generator 116 may be a free running saw tooth generator or similar device capable of producing a linear scanning of the face of the tube 18. The period for a vertical scan will normally be on the order of several seconds, or an interval of time required for two or three heartbeats to occur. As a consequence, while the transducer 20 is transmitting and receiving ultrasonic pulses the cathode-ray tube 18 will horizontally scan at the same rate as the pulse repetition rate. However, the horizontal scans will slowly progress vertically across the face of the tube 18 so that a raster will be developed.

As the electron beam scans horizontally across the face of the tube 18, its intensity will be modulated. As a result, each line of the display will ideally have bright or dark spots corresponding to the echoes received from the mitral valve and also from the back side of the heart. As the heart pumps, and the mitral valve opens and closes the position of these bright spots will move horizontally across the face of the tube. As the slow vertical scan occurs and the display lines progressively rise across the face of the tube, the bright spots or dark spots will also move horizontally. The spots will thereby form lines which extend vertically of the tube. The shape of these lines will correspond somewhat to the lines in FIGS. 5, 6 and 7, depending upon whether the mitral valve is operating properly or not.

Figure 3:
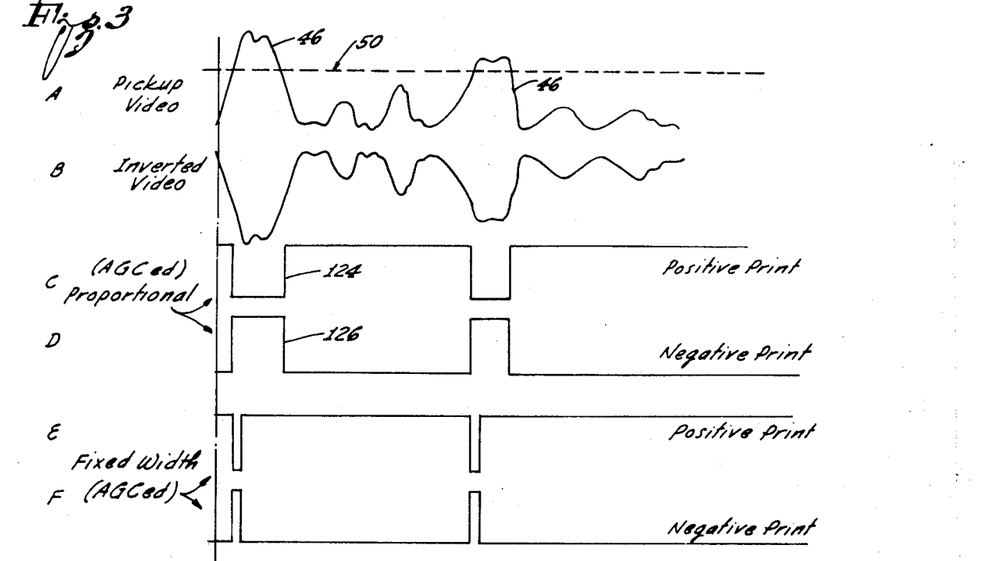
FIG. 3 is a series of waveforms present in various portions of the block diagram of FIG. 2.

As may be observed from lines A and B of FIG. 3, the rise and fall of the video signal in the regions of the leading and trailing edges of the pulses 46 and 48 are relatively slow. This will result in the dark or bright spots and the resulting dark or bright lines having "feathered" or "tapered" edges wherein the intensity varies gradually. As a result, it is difficult to determine exactly the limits of the line. Also, in between the pulses 46 and 48 there may be a substantial number of pulses 52 of intermediate amplitude which will cause some shading of the display to occur.

This type of display contains considerable information that is very desirable for some types of work. However, in other types of work it has been found desirable to provide a display wherein the bright lines are more clearly defined, and wherein there is no "clutter" in the display resulting from the intermediate background signals. In order to provide this type of a display the moveable contact 68 in the selector switch 54 may be set to engage one of the fixed contacts coupled to the outputs from the Schmitt trigger circuit 38 or to one of the outputs from the monostable multivibrator circuit 40.

The Schmitt trigger circuit 38 is coupled to one side of the video amplifier-inverter 36 so as to receive the raw video signals. This circuit 38 which may be of a conventional design, is adapted to switch from one state to another state only when the potential on the control input exceeds a predetermined level. In the absence of a signal on the input, the first or C output 120 will be at a low level and the second or D output 122 will be at a high level. However, when a negative-going signal present on the input exceeds the threshold level, first or C output 120 will rise to the high or more positive level, and the second or D output 122 will fall to the low or more negative level. It may thus be seen that a series of square wave pulses 124 and 126 will always have the same amplitudes but the pulses on the outputs will be of opposed polarity.

In the present instance, the threshold level for switching the Schmitt trigger 38 is set so as to be substantially equal to the threshold level 50 in the video signal (line A or B). This may be accomplished by making the gain of the receiver 26 or inverter 36 variable of the trigger level of the trigger 38 adjustable whereby the threshold level 50 may be set at any desired point. As a result, whenever a pulse exceeding the threshold level 50 occurs, the Schmitt trigger 38 will reverse its state, and produce square wave pulses 124 and 126 of opposed polarity on the outputs 120 and 122. Although the amplitudes of the pulses will be constant, the durations thereof will correspond to the interval of time wherein the video pulse exceeds the threshold level 50.

When the movable contact 68 of the selector switch 54 engages the C contact 60, as seen in FIG. 2, the square wave of line C of FIG. 3 will be coupled through the DC coupling circuit 72 to the control grid 70 of the cathode-ray tube 18. Normally, this wave is sufficiently positive to allow the electron beam to reach the face of the tube 18 and produce a bright line. When the square wave pulses occur, the electron beam will be cut off so as to produce dark spots in the bright line. The positions of these dark spots correspond to the positions of the mitral valve and the backwall of the heart. As the vertical scan progresses the bright lines with dark spots therein will be drawn at successively higher levels on the face of the tube 18. This will result in a bright raster with a plurality of dark lines extending vertically thereof.

Figure 5:
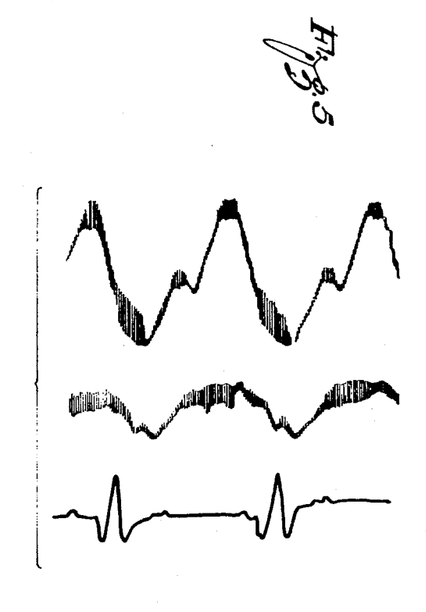
Figure 6:
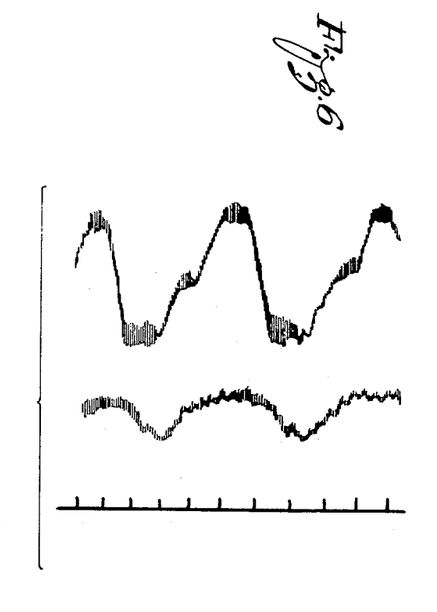

During each of the horizontal scans the lateral positions of the dark spots will vary slightly as the mitral valve and heart wall move. As a consequence, the moving dark spots will produce dark lines that have a shape corresponding to the motion of the mitral valve and the backwall of the heart. Displays of this nature are illustrated in FIGS. 5 and 6. If the switch 68 is moved to the other contact 62 the identical print will be produced except that it will be a negative, i.e., the background will be dark and the lines will be bright.

It may be noted that the square wave pulses from the Schmitt trigger 38 have very sharp leading and trailing edges. As a result, each of the dark or bright spots will have very sharp edges. The vertical lines will therefore have very clearly defined edges that can be easily observed and measured. In addition, since the intensity of the electron beam will not be modulated between the pulses, there will be no "clutter" in the display resulting from the lesser pulses 52. Also, when the beam reaches the face it will be of constant amplitude whereby the display will be of uniform brilliance. This insures a display having a maximum amount of contrast.

It may be noted from lines A and B that under some conditions the video pulse is narrow and under other circumstances it is wide. This will produce corresponding variations in the width of the pulses 124 and 126 from the Schmitt trigger 38. This, in turn, causes the widths of the dark or bright spots on the face of the tube 18 to vary in a corresponding manner. The effects of these variations are readily apparent in FIGS. 5 and 6. It may be seen that the lie representing the motion of the mitral valve includes a series of broad portions and a series of relatively narrow portions. Also, the line representing the motion of the backwall of the heart includes several broad portions and several narrow portions. However, the lines are of high contrast and have boundaries that are well defined. As a consequence, this type of a display can be readily observed and analyzed so as to determine the nature of the opening and closing of the mitral valve.

Under some circumstances, it may be desirable to provide a display wherein the lines have uniform width over their entire length. In order to obtain a display of this nature, the movable contact 68 may be placed against one of the contacts coupled to the monostable multivibrator 40.

Figure 7:
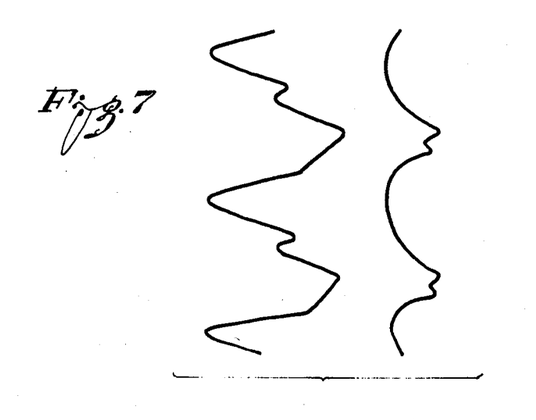

The multivibrator 40 is coupled to the D output of the Schmitt trigger 38 so as to receive the wave in line D of FIG. 3. The multivibrator includes means such as a differentiator that is responsive to the leading edge of the pulse from the Schmitt trigger circuit 38. The monostable multivibrator 40 will thereby be effective to change its state substantially coincident with each of the leading edges of the square wave pulses. The multivibrator 40 is adjusted so that it will reverse its state for a predetermined time interval and then naturally return to its original state. As a consequence, the outputs 128 and 130 will have square wave pulses of uniform duration thereon that are coincident with the leading edges of the pulses in lines C and D, and independent of the time durations of those pulses. These pulses are shown in lines E and F of FIG. 3. As a result of the uniform amplitudes and time durations of the pulses, the dark or bright spots will have uniform widths and contrasts. This, in turn, will insure the dark or bright lines having substantially identical widths. A display of this variety is shown in FIG. 7.

In order to employ the present tester 10 for studying the motion of the mitral valve, or similar organ, the tester 10 is turned "ON" on the probe 20 positioned so as to be acoustically coupled to the organ which is to be investigated. In the present instance, the probe 20 is positioned on the patient's chest and transmits ultrasonic energy into the mitral valve and heart region and receives echoes therefrom.

The clock 30 produces a series of clock pulses having the clock frequency, for example 1 KC. These pulses will simultaneously energize the pulser-receiver 26 and the horizontal sweep generator 113. The pulser-receiver 26 will momentarily energize the probe 20 so that a short burst of ultrasonic energy will be transmitted into the patient's heart. The probe 20 will then "listen" for any echoes, and if such echoes are received, will produce an electrical signal corresponding to the reflections.

The resultant video signals are coupled to the video amplifier-inverter 36 and Schmitt trigger circuit 38 and monostable circuit 40 so as to produce a series of waveforms similar to those shown in FIG. 3. If the multiposition switch 54 is in engagement with the first or A contact 56 from the amplifier 36, the positive wave of line A will be coupled through the DC coupling circuit 72 to the control grid 70 of the cathode-ray tube 18. Each time a pulse of ultrasonic energy is transmitted into the region of the heart, the clock pulse will cause the horizontal sweep generator 113 to initiate a horizontal scan across the face of the tube. At the same time, the vertical generator 116 will be producing a scan wave that will cause the electron beam to vertically scan the face of the tube 18 at a relatively slow rate.

During each of the horizontal scans, a bright spot will be produced each time an echo is received from the mitral valve, and also each time an echo is received from the backwalls of the heart. As the heart beats and the mitral valve opens and closes, the distances will vary and as a consequence, the lateral position of the bright spots will vary. Accordingly, as the vertical scan progresses, bright lines will be produced which extend vertically of the cathode ray tube 18, and wiggle horizontally thereof in accordance with the motion of the mitral valve and the heart.

If the movable contact 68 is moved to the second or B contact 58, the negative signal of line B will be coupled to the control grid 70 and a negative display will be produced. Both of the displays produced by the raw video signal include broad lines with edges of varying brilliance.

If the movable contact 68 is moved to the third or C contact 60, the square wave pulses 134 from the Schmitt trigger 38 will be coupled to the control grid 70. The tube 18 will produce an oscillogram similar to FIGS. 5 and 6 wherein the background is dark and the vertical lines are bright.

If the heart is of a normal healthy variety this display will be similar to FIG. 5. The vertical line 132 includes a peak 133 adjacent to the left side of the tube face for each heartbeat. A segment 134 of the line 132 then progresses towards a peak 136 on the right side. This segment 134 includes a first section 138 with a first slope and a second section 140 with another slope. The second section 140 is relatively broad and the slope is at a large angle to the vertical. The next segment 142 of the line 132 extends upwardly to the left to the peak 133 for the next beat. The second segment 142 includes a momentary reversal 144 about the middle thereof. As previously stated, this display corresponds to a substantially normal heart.

In the event the mitral valve is not opening and closing properly, the shape of the vertical line may be materially altered. For example, it may be similar to the line 132' in FIG. 6. This line 132' is similar to the line 132 in FIG. 5. It differs therefrom primarily in the fact that the broad section 140' of the first segment 134' is very nearly vertical.

In order to assist in evaluating the characteristics of the display, it has been found desirable to provide a suitable reference display in line with the line 132. In order to accomplish this, a mixer 146 may be connected in parallel to the switch 112 so as to be electrically between the horizontal sweep generator 113 and the horizontal amplifier 114. When the switch 112 is closed, the mixer 146 is bypassed. However, when the switch 112 is open, the mixer 146 will be operative and will receive the horizontal sweep signal. A second input to the mixer 146 is coupled to a switch 148. The switch 148 is, in turn, coupled to a source of reference signals. The source may be effective to supply electrocardiographic signals (EKG.) 150 or timing pulses (markers) 152.

Near the completion of each horizontal scan, an EKG. or marker component will be added to the horizontal sweep signal. This will displace the electron beam from its normal position during this instant. The amplitude of the beam is then modulated to produce a bright or dark spot. As the vertical scanning progresses, the bright or dark spots will combine to produce a series of time markers as seen in FIG. 6 so as to permit measuring the time interval between different portions of the line 132 and/or the regularity of the heartbeat. Alternatively, or in conjunction therewith, the spots may provide a display as seen in FIG. 5. As a result, the nature of the EKG. signals may be compared directly with the nature of the motion of the mitral valve.

If the movable contact 68 in the selector switch 54 is moved to the second or D contact 62, the negative signal from the Schmitt trigger circuit 38 will be coupled to the tube 18 and a negative of the displays shown in FIG. 5 or 6 will be produced. More particularly, the beam will be on as it scans horizontally across the face of the tube except during the time interval when an echo is being received. As a result, the display will be bright with dark lines being drawn vertically.

If the movable contact 68 in the switch 54 is moved to the contact 64, the positive signal in line E will be coupled from the monostable multivibrator 40 to the control grid 70. Pulses from the multivibrator 40 will be of substantially uniform amplitude and uniform time duration. As a consequence, the width of the line will be substantially uniform throughout its entire length.

As may be seen in the foregoing descriptions, However, the width of the operator has a wide choice of the types of display that he can use. For example, the multiposition selector switch 54 can be positioned so as to produce a display of the raw video signals in either a positive or negative print. This will produce a broad display having relatively tapered or feathered edges with considerable information contained in the background. Alternatively, the operator may position the switch 54 so as to obtain a positive or negative print corresponding to FIG. 5 and 6. These displays have substantially uniform brightness throughout all portions thereof. However, the width of the display tends to vary slightly during the various portions thereof. As a further choice, the operator may position the switch 54 so as to produce a display having a substantially uniform width throughout its entire length. These various displays will permit the operator to study the motion of the mitral valve and the heart, and to determine whether or not the various organs are operating correctly.

While only a single embodiment of the present invention is disclosed herein, it will be readily apparent to persons skilled in the art that numerous changes and modifications may be made thereto without departing from the scope of the invention. For example, the various circuits such as the video inverter, the Schmitt trigger and the monostable multivibrator may be replaced with other circuits which will shape the pulses by other means.

What is claimed is:

1. In combination:
    first means for transmitting ultrasonic energy into a workpiece, and for receiving echoes of said energy reflected from within the workpiece;
    second means responsive to said first means for producing an electrical signal the amplitude of which changes through a threshold level each time an echo is received;
    a cathode-ray oscilloscope means including an electron beam and means for scanning the electron beam across the face of said cathode-ray oscilloscope means each time a pulse of energy is transmitted;
    signal-processing means coupled to said second means and responsive to the amplitude of the electrical signal thereof, said signal-processing means having two separate states and being effective to change from one state to the other state when the electrical signal of said first means changes through the threshold level; and
    said signal-processing means including gating means for gating the electron beam of said cathode-ray oscilloscope means between a first level when said signal-processing means is in one of said states and a second level when said signal-processing means is in the other of said states.

2. An ultrasonic tester as defined in claim 1 wherein said signal-processing means includes monostable means having a first state and a second state, said monostable means being coupled to said second means and effective to change from the first state to the second state for a predetermined interval of time when the electrical signal passes through the threshold level, said monostable means being coupled to the cathode-ray oscilloscope means to gate the electron beam between a first level when in one state and a second level when in the other state.

3. An ultrasonic tester as defined in claim 1 and further including
    coupling means coupling the signal-processing means to the cathode-ray tube to modulate the intensity of said electron beam in response to the state thereof and to brighten the electron beam as a function of the state of said signal-processing means.

4. The combination of claim 3 wherein
    said coupling means includes means effective to position the electron beam adjacent one side of the face of the oscilloscope means for a short interval during each scan, and to modulate the intensity of the electron beam during this interval.

5. An ultrasonic tester for inspecting a workpiece including the combination of
    ultrasonic means adapted to be acoustically coupled to the workpiece for transmitting ultrasonic energy into the workpiece, said means being effective to receive echoes returned from the workpiece and to produce a first electrical signal corresponding to a characteristic of said workpiece,
    means adapted to be coupled to said workpiece for producing a second electrical signal corresponding to another characteristic of the workpiece, for use as a reference with respect to the received echoes returned to the ultrasonic means,
    display means having a display area, said display means being coupled to the ultrasonic means and to the second signal-producing means for displaying the first and second electrical signals in the display areas,
    first scan means coupled to said display means for scanning said display area in a first direction at a fast rate to provide a display line,
    means coupled to the ultrasonic means, signal means and to the display means for intermittently modulating the intensity of the display line in response to the first and second electrical signals, and
    second scan means coupled to said display means for scanning said display area in a second direction at a slow rate.

6. An ultrasonic tester for inspecting a workpiece including the combination of
    ultrasonic means adapted to be acoustically coupled to the workpiece for transmitting ultrasonic energy into the workpiece for transmitting ultrasonic energy into the workpiece, said means being effective to receive echoes reflected from the workpiece and produce a first electrical signal having pulses time modulated to correspond to a dimension of the workpiece,
    reference means adapted to be coupled to said workpiece to produce a reference signal corresponding to other characteristics of the workpiece,
    a cathode-ray oscilloscope means having an electron beam and first and second deflection means for deflecting said beam in first and second directions,
    means coupled to the ultrasonic means, reference means and first deflection means to modulate said electron beams in response to the time-modulated pulse and in response to the reference electrical signal after the time-modulated pulse occurs,
    first scan means coupled to the first deflection means for scanning said electron beam in a first direction at a fast rate while said electron beam is amplitude-modulated by the time-modulated pulses in the first electrical signal and by the reference electrical signal, and
    second scan means coupled to the second detection means for scanning said electron beam in a second direction at a slow rate to form a raster display on said cathode-ray oscilloscope tube having a first portion corresponding to the time-modulated pulses and a second portion corresponding to the reference signals.

7. An ultrasonic echocardiograph for producing a display of the movement of at least a portion of a heart, said echocardiograph including:
an ultrasonic search unit adapted to transmit ultrasonic energy into the region of the heart and to receive echoes reflected from said portion of the heart and produce electrical signals corresponding thereto;
a cathode-ray tube having a face and electron means for directing electrons against said face;
signal-processing means coupled to said search unit and said cathode-ray tube for modulating the intensity of the electron beam in said tube as a function of said electrical signal; and
means for scanning the electron beam across the face of said cathode-ray tube in a first direction at a first scan velocity which is a function of the velocity of the ultrasonic energy and in a second direction at a second scan velocity, said second scan velocity being at a rate which is at least as long as the period of a heartbeat of the heart of the particular patient being displayed.

8. The electrocardiograph as defined in claim 7 wherein said signal-processing means includes:
a monostable multivibrator having a first state and a second state, said monostable multivibrator remaining in said second state for a predetermined time interval,
means coupling the multivibrator to said search unit for changing said multivibrator from the first state to the second state in response to the echo pulses in the electrical signal,
means coupling the monostable multivibrator to the cathode-ray tube to gate the electron beam "ON" in the fast direction scan when the multivibrator is in one state and "OFF" when in the other state to brighten the beam as a function of reflected echo pulses.

9. An ultrasonic cardiograph including:
ultrasonic transducer for periodically transmitting pulses of ultrasonic energy into the region of a heart and receiving return echoes of said energy from the heart region and for producing an electrical signal having pulses corresponding to the returned energy;
signal-processing means having two separate states and being coupled to the ultrasonic transducer for switching to one of said states during the pulses in the electrical signal;
a cathode-ray oscilloscope tube having an electron beam and a display face;
scan means for scanning the electron beam across the display face, and
means coupling the cathode-ray tube to said signal-processing means and responsive to said signal-processing means for gating the electron beam "ON" when the signal-processing means is in one of said states and for gating the beam "OFF" when the signal-processing means is in the other of said states.

10. The cardiograph as defined in claim 9 including
means having two separate states coupled to the ultrasonic transducer and responsive to the amplitude of the electrical signal to change from one of said states to the other of said states for a predetermined interval when the electrical signal changes through the threshold level,
said means being coupled to said cathode-ray tube for controlling the electron beam therein.

11. An ultrasonic cardiograph as defined in claim 9 wherein said scan means includes
a fast scan and a slow scan coupled to the cathode-ray tube for scanning said beam in two separate directions, said fast scan being coupled to the signal-processing means for scanning the beam in the first direction each time a pulse of ultrasonic energy is transmitted, said slow scan being adapted to scan the beam in the second direction at a slow rate compared to the beat of said heart to form a raster on the face of the tube.

12. In combination:
an ultrasonic probe including an input/output circuit;
a pulser/receiver including an input/output being coupled to the input/output circuit of said probe, an input circuit and an output circuit;
a clock having an output coupled to the input of said pulser;
a video-processing circuit including an input coupled to the output of said pulser/receiver, said video-processing including a plurality of outputs, said video-processing system including means for providing a signal on each output of different character indicative of signal on the input signal thereof;
a cathode-ray tube having a control grid electrode vertical deflection electrodes and horizontal deflection electrodes;
switching means coupled between the control grid of said cathode-ray tube and said video-processing system for selectively coupling said grid to one of the outputs of said video-processing circuit;
a horizontal sweep generator having an input coupled to the output of said clock and an output coupled to the horizontal deflection electrodes of said cathode ray tube; and
a vertical scan generator having a repetitious rate relatively slower than said horizontal sweep generator, said vertical scan generator having an output coupled to the vertical deflection electrodes of said cathode-ray tube.

13. The combination as defined in claim 12 wherein said means included in said video-processing circuit including a video amplifier/inverter having an input coupled to the output of said pulser/receiver, and having at least one output which is included in the plurality of outputs of said video processing circuit.

14. The combination as defined in claim 13 wherein said means included in said video-processing circuit further including a Schmitt trigger having an input coupled to one of the outputs of said video amplifier/inverter and having at least one output which is included in the plurality of outputs of said video-processing circuit.

15. The combination as defined in claim 14 wherein said means included in said video-processing circuit further including a monostable multivibrator having an input coupled to one of the outputs as said Schmitt trigger and having at least one output which is included in the plurality of outputs of said video-processing circuit.

16. In combination:
an ultrasonic probe including a transducer being adapted to emit ultrasonic energy in response to an electrical signal and generate an electrical signal in response to an ultrasonic signal;
a pulser/receiver coupled to said search unit and being adapted to supply a pulse of electrical signal to the transducer of said probe, said pulser/receiver being further adapted to receive electrical signals from the transducer in said probe generated in response to the ultrasonic energy;
a clock being coupled to said pulser/receiver and being adapted to provide a series of clock pulses to said pulser/receiver;
a video-processing circuit being coupled to receive signals from said pulser/receiver generated in said probe, said video-processing circuit including means responsive to the received signal, for producing a plurality of outputs indicative of the received signals each having a difference characteristic;
a cathode-ray tube including a control grid, a horizontal deflection means and a vertical deflection means;
switching means coupled between the control grid of said cathode-ray tube and a selected one of the plurality of outputs of said video-processing circuit;

a horizontal sweep generator having an input circuit being coupled to said clock and an output circuit being coupled to the horizontal deflection means of said cathode-ray tube, said horizontal sweep generator being responsive to signals from said clock to provide horizontal sweeps on said cathode ray tube; and a vertical scan generator having a repetitious rate relatively slower than said horizontal sweep generator, said vertical scan generator having an output circuit being coupled to the vertical deflection means of said cathode ray tube.

* * * * *